Patented Aug. 28, 1928.

1,682,293

UNITED STATES PATENT OFFICE.

LEON LILIENFELD, OF VIENNA, AUSTRIA.

ARTIFICIAL MATERIAL AND PROCESS FOR MAKING SAME.

No Drawing. Application filed July 23, 1924, Serial No. 727,801, and in Austria April 4, 1924. Renewed July 16, 1928.

The hitherto-known derivatives of cellulose which are soluble in alkalies possess many disadvantages in connection with their industrial application.

Viscose undergoes a steadily increasing spontaneous decomposition with the liberation of carbon disulphide. This reaction has to be watched carefully, and interrupted at the correct time, since the viscose is not suitable for its most important applications (for instance, spinning artificial silk) either when it is too fresh or when it has been allowed to mature for too long a period, but only when it is in a very definite stage in its spontaneous decomposition. In order to attain this stage, which must be maintained exactly, and beyond which the decomposition must not be allowed to proceed, a maturing process occupying several days is necessary. If the viscose is allowed to stand for too long a period, it undergoes decomposition completely with the separation of cellulose hydrate.

Moreover, viscose is accompanied by numerous impurities, which are colored and hinder appreciably its manipulation and applications. The carbon-disulphide and other sulphur compounds which are liberated during the spontaneous decomposition give it an unpleasant odor and confer on it properties which from the standpoint of hygiene, are little to be desired. A more important drawback is the fact that the by-products present in the viscose color and contaminate the precipitating bath, and evolve hydrogen sulphide during the precipitation process, so that an intricate and costly plant is necessary to render innocuous the unpleasant smell and highly poisonous properties of the substance.

If the precipitation process is to yield satisfactory technical results, it places great demands on the composition of the precipitating liquor. Dilute acids or salts have been found to be insufficient in this respect; only mixtures of acids and salts, to which in certain cases an organic substance must also be added, have the desired effect.

The technical products manufactured from viscose, when precipitated in insoluble form, are dull owing to the presence of sulphur, and are colored by other impurities. They must therefore be freed from sulphur and as a rule, also bleached.

Purified viscose is not in consideration industrially, since the purification processes are complicated and expensive, and have an undesirable influence upon its properties.

The alkyl derivatives of cellulose which are insoluble in water and soluble in alkalies (see for instance British Specifications Nos. 177810, 203346 and 203347) yield technical products (such as thread, films or the like) whose tensile strength in contact with water and flexibility in the dry state do not satisfy the highest demands.

From the above described disadvantages which accompany the cellulose derivatives soluble in alkalies hitherto used, it is apparent that it is desirable to substitute for them new cellulose compounds which do not suffer from these faults.

According to the present invention, a cellulose-hydroxyparaffin-monocarboxylic acid insoluble in cold or hot water, but soluble in aqueous alkalies, is used, either by itself or mixed with other substances suitable for the purpose, as the basis of the artificial materials for the manufacture of which the known cellulose derivatives soluble in alkalies, especially viscose, have hitherto been used. (The cellulose-hydroxy-paraffin-monocarboxylic acids may be regarded as compounds in which cellulose has entered into the alcoholic hydroxyl group of a hydroxy-paraffin-monocarboxylic acid.)

The cellulose-hydroxy-paraffin-monocarboxylic acids, which may readily be obtained for example by acting on cellulose with a halogen derivative of a fatty acid in presence of an alkali (as described and claimed in my concurrent applications Nos. 727,803 and 727,804) possess the following properties which render them particularly suitable for the purpose in question.

(1) They are resistant and indifferent; for instance, they do not change appreciably on boiling for several hours with strong solution (for instance caustic soda solution of 20 per cent strength).

(2) They are stable both in the solid and dissolved state.

(3) They are colourless, as also are their solutions.

(4) Even in the crude reaction mixture obtained in their preparation they contain no by-products which render it difficult to work them up into artificial materials.

(5) They are of a high degree of purity when isolated from the mixture.

(6) They are easily precipitated in the form of technical articles. Solutions of the new cellulose derivatives brought into the desired form solidify even on treatment with a dilute inorganic or organic acid (even tannic acid) or with a solution of a salt, or merely with alcohol, as well as with formaldehyde solution, to yield products which possess the solidity necessary for the subsequent operations such as washing and the like.

(7) They are readily soluble in dilute solutions of alkalies.

(8) They have colloidal properties of a high degree; their solutions are viscous sols.

(9) The threads, skins, layers, coatings, and artificial materials in general, obtained from their solutions are colorless, transparent, strong and also flexible in the wet or dry state. In this respect they are superior to the alkyl derivatives of cellulose which are soluble in alkalies but insoluble in water.

The present invention consists in dissolving in an alkali, either alone or mixed with binding agents, colloids, or softening agents, a cellulose-oxy-acid insoluble in water and soluble in alkalies, which is obtained by the reaction between cellulose and a halogen derivative of a fatty acid in presence of an alkali, bringing the solution or paste so obtained into the form of the desired artificial material, if necessary with the addition of a filling material, pigment, dyestuff or softening agent, and treating the formed material, if desired after previously drying it partially or completely, with an agent which is capable of precipitating the cellulose-oxy-acid. As precipitating agent, there may be used in addition to the substances or mixtures of substances known in the viscose and ammoniacal-copper-oxide-cellulose industries, also many other substances which are unsuitable for the conversion of viscose into technical products.

The precipitating agent may be used either cold, warm, or hot, in the form of a bath, or of a spray. The washing process and drying process which follow the precipitating are conducted in known manner.

As colloids and softening agents suitable for addition to the cellulose-oxy-acids, the following may be mentioned, for example:

Hydrated cellulose or hydro-cellulose soluble in alkalies, viscose (cellulose-xanthate) in the crude form or purified by any known process, albuminous substances, proteins, glue (gelatine), anyloid, starch and starch-like materials, dextrin, gums (such as gum arabic, tragacanth, beet gum, or the like), pectous materials, tragasol, resins soluble in alkalies, resinous condensation products soluble in alkalies obtained by the condensation of a phenol, or an aromatic amine, or a urea with an aldehyde, shellac, glycerine, di-glycerine, poly-glycerine, glycols, sugars and syrups, soaps, fats, ammonium or alkali-metal derivatives of fatty-sulphonic acids, such as turkey-red oil, and the like.

On account of their colloidal nature, the cellulose-hydroxy-paraffin-monocarboxylic acids may be mixed with colloids or softening agents insoluble in water to produce emulsions or suspensions which do not separate at all, or which do not separate readily. Their solutions or pastes may therefore be mixed with agents such as india rubber, gutta percha, balata, fats, drying or non-drying oils, metallic salts of fatty acids, and the like.

The new cellulose derivatives are especially suitable for the manufacture of the following artificial materials:

Artificial threads, particularly artificial silk; films, coatings and layers of every kind; dressings insoluble in water for woven textiles, paper, leather and the like; sizes for use in spinning; book cloth; artificial leather; adhesives and cements; thickening agents or agents for fixing pigments in textile printing; plates, and plastic materials in general; and the like.

The expression "artificial material" used in the specification and claims includes all the artificial materials mentioned in the foregoing paragraph. The term "artificial material" is used in the further sense that it is intended to exclude the cellulose-oxy-acids or cellulose hydroxy-paraffin monocarboxylic acids as chemical compounds per se but is intended to include matter made from or including such acids as distinguished from the mere chemical compounds.

The expression "cellulose-oxy-acid" or "cellulose-hydroxy-paraffin-monocarboxylic acid" used in the specification and claims includes those cellulose derivatives in which cellulose, a cellulose hydrate, a hydro-cellulose, or an oxy-cellulose has entered into the alcoholic hydroxl group of a hydroxy-paraffin-monocarboxylic acid, and which may be obtained by acting on cellulose or on a conversion product thereof with a monohalogen derivative of a fatty acid in presence of an alkali.

The following examples illustrate the invention, the parts being by weight:

*I. Films.*

1. 100 parts of a cellulose-glycollic acid or cellulose-lactic acid insoluble in water but soluble in dilute alkalies, are dissolved, whilst kneading or stirring or the like, in 900–1200 parts of caustic soda solution of 5–6 per cent strength. The solution, after filtering if necessary, is distributed in the shape of a layer by means of a suitable hopper and coagulated by a solution of sulphuric acid of 10–20 per cent strength, of acetic acid of 25 per cent strength, of ammonium chloride of 30 per cent strength, of tannin of 20 per cent strength, or of formaldehyde of 40 per cent strength, or by means of any other precipitating bath known in the viscose industry, for example one composed of sulphuric acid, a salt, and an organic substance such as sugar. The solidified film is washed thoroughly with water and dried. The endless film may be treated before or after drying with an aqueous solution of glycerine (for instance, of 10 per cent strength) in order to increase its flexibility.

II. Artificial thread, particularly artificial silk and artificial hair.

2. A solution of a cellulose-glycollic acid or a cellulose-lactic acid as used in Example I is forced or allowed to flow through a fine orifice into a precipitating bath as referred to in Example I, and the solidified thread which is formed is thoroughly washed with water and dried. The artificial thread may be treated, either in the course of its manufacture or when completed, with a hardening agent, such as formaldehyde or the like.

3. A mixture of 50 parts of viscose (prepared in the usual manner and containing 8–12 per cent by weight of cellulose) and 50 parts of a solution of a cellulose-glycollic acid and or a cellulose-lactic acid prepared as in Example I, is spun into artificial thread as described in Example 2.

III. Finishes for textile materials.

4. A woven fabric, such as cotton fabric, is provided with one or more coatings of a solution of a cellulose-glycollic acid prepared as in Example 1, by means of a suitable apparatus, for instance, a padding-machine or a spreading-machine, and is then dried. (When more than one coating is applied, it is desirable to dry after the application of each layer.) After drying, and if necessary after steaming for a short while, the coated material is introduced into a precipitating bath as referred to in Example 1, and is then washed and dried. The textile may be treated before or after drying, with a softening agent, for instance, a soap solution, an aqueous solution of turkey-red oil, or an aqueous solution of glycerine.

5. The procedure is as in Example 4, with the exception that there is added to the solution of the cellulose-glycollic acid a filling material, for instance, zinc-white, china-clay, or talc.

6. The procedure is as in Example 4 or 5, with the exception that there is added to the solution of the cellulose-glycollic acid a softening agent, such as a drying or non-drying oil, or a soap.

7. The procedure is as in Example 4, 5 or 6, with the exception that the solution of the cellulose-glycollic acid is mixed with a solution of starch.

After completion, the dressed or coated textile material may be smoothed or calendered, or patterned or glazed by treatment with riffled or patterned rollers.

IV. Textile printing.

8. 100 parts of a solution of cellulose-glycollic acid prepared as in Example 1 are mixed with 6–10 parts of finely ground mica, or with 4 parts of lamp black or with 8–10 parts of zinc-white, and printed by means of suitable printing rollers on cotton material, if necessary after previously grinding in a color-grinding mill. The printed and dried fabric is then treated, if desired after previously steaming, with a precipitating bath as referred to in Example 1; it is then washed and dried.

V. Book cloth.

9. A conveniently porous textile material, such as calico, is provided with one or more coatings of a solution of a cellulose-glycollic acid prepared as in Example 1, until the pores of the material are completely filled. If more than one coating is applied, the material is dried after each coating. The material may be calendered hot or cold, and after each coating, or only after the final coating. The coated, filled material is then treated with a precipitating bath as referred to in Example 1, and is then washed and dried.

10. The procedure is as in Example 9, with the exception that there is added to the solution of the cellulose-glycollic acid, some zinc-white, china-clay, loose cellulose fibre, soot, a lake, mica, a dye-stuff resistant towards alkalies, or the like.

11. The procedure is as in Example 9 or 10, with the exception that there is added to the solution of the cellulose-glycollic acid about 10 per cent by weight of castor oil (calculated on the weight of the cellulose-glycollic acid).

The finished book cloth may be provided with any desired pattern or grain by pressing between plates or by embossing by means of patterned rollers, or the like, or it may be glazed by calendering.

I claim:

1. A process for the manufacture of artificial materials, which comprises bringing a solution in an alkali of a cellulose-hydroxy-paraffin-monocarboxylic acid insoluble in water into the form of an artificial material and then treating it with a suitable precipitating agent.

2. A process for the manufacture of artificial materials, which comprises bringing a solution in an alkali of a cellulose-glycollic acid insoluble in water into the form of an artificial material and then treating it with a suitable precipitating agent.

3. A process for the manufacture of artificial materials, which comprises bringing a solution in an alkali of a cellulose-hydroxy-paraffin-monocarboxylic acid insoluble in water into the form of an artificial material and then treating it with an acid.

4. A process for the manufacture of artificial materials, which comprises bringing a solution in an alkali of a cellulose-hydroxy-paraffin-monocarboxylic acid insoluble in water into the form of an artificial material, drying it and then treating it with a suitable precipitating agent.

5. A process for the manufacture of artificial materials, which comprises bringing a solution in an alkali of a celulose-hydroxy-paraffin-monocarboxylic acid insoluble in water, mixed with at least one other colloid, into the form of an artificial material and then treating it with a suitable precipitating agent.

6. A process for the manufacture of artificial materials, which comprises bringing an alkaline solution containing at least one cellulose - hydroxy - paraffin - monocarboxylic acid insoluble in water, into the form of an artificial material, and treating it with a suitable precipitating agent.

7. As new products, artificial materials comprising at least one cellulose-hydroxy-paraffin-monocarboxylic acid which is insoluble in water and soluble in alkalies.

8. As new products, artificial materials comprising a cellulose-glycollic acid which is insoluble in water and soluble in alkalies.

9. As new products, artificial materials containing as essential constituent at least one cellulose - hydroxy - paraffin - monocarboxylic acid which is insoluble in water and soluble in alkalies.

10. As new products, artificial materials containing as essential constituent a cellulose-glycollic acid which is insoluble in water and soluble in alkalies.

11. As new products, artificial materials containing at least one cellulose-hydroxy-paraffin-monocarboxylic acid which is insoluble in water and soluble in alkalies and a softening agent.

12. As new products, artificial materials containing a cellulose-glycollic acid which is insoluble in water and soluble in alkalies and a softening agent.

13. As new products, vegetable textile fibrous materials having a silk-like lustre and which comprise a vegetable textile material impregnated with a monohydroxy fatty acid compound of cellulose.

In testimony whereof I affix my signature.

LEON LILIENFELD.